United States Patent
Jiang et al.

(10) Patent No.: US 12,415,169 B2
(45) Date of Patent: Sep. 16, 2025

(54) SLUG-FLOW MANUFACTURING OF UNIFORM AND CONTROLLABLE MICROPARTICLES FOR BATTERY CATHODES

(71) Applicant: VIRGINIA COMMONWEALTH UNIVERSITY, Richmond, VA (US)

(72) Inventors: Mo Jiang, Richmond, VA (US); Ram B. Gupta, Richmond, VA (US)

(73) Assignee: Virginia Commonwealth University, Richmond, VA (US)

( * ) Notice: Subject to any disclaimer, the term of this patent is extended or adjusted under 35 U.S.C. 154(b) by 730 days.

(21) Appl. No.: 17/780,459

(22) PCT Filed: Nov. 27, 2020

(86) PCT No.: PCT/US2020/062492
§ 371 (c)(1),
(2) Date: May 26, 2022

(87) PCT Pub. No.: WO2021/108760
PCT Pub. Date: Jun. 3, 2021

(65) Prior Publication Data
US 2022/0410112 A1    Dec. 29, 2022

Related U.S. Application Data

(60) Provisional application No. 62/940,471, filed on Nov. 26, 2019.

(51) Int. Cl.
*B01J 19/00* (2006.01)
*C01G 53/82* (2025.01)

(52) U.S. Cl.
CPC ....... *B01J 19/0006* (2013.01); *B01J 19/0066* (2013.01); *C01G 53/82* (2025.01); *C01P 2004/61* (2013.01); *C01P 2006/40* (2013.01)

(58) Field of Classification Search
None
See application file for complete search history.

(56) References Cited

U.S. PATENT DOCUMENTS 12,116,643 B2 *  10/2024  Takahashi ................ B03B 9/04
2021/0057739 A1 *  2/2021  Dai ....................... H01M 4/525

OTHER PUBLICATIONS

Termühlen, et al., Continuous slug flow crystallization: Impact of design and operating parameters on product quality, Chemical Engineering Research and Design, vol. 170, 2021, pp. 290-303. (Year: 2021).*

(Continued)

*Primary Examiner* — Alix E Eggerding
(74) *Attorney, Agent, or Firm* — WCF IP (57) ABSTRACT

Slug flow manufacturing systems and methods for production of battery microparticle materials such as nickel-cobalt-manganese oxide (NCM) are disclosed. The slug flow reactor system is capable of producing microparticles reproducibly and continuously in desired scales. The system may be run with fast kinetics (e.g., complete reaction from nucleation to particle recovery completes within a few minutes) and near-ambient reaction temperature (e.g., allowing to use inexpensive plastic tubing). The system allows control of composition (overall, and radial profile) and size of microparticles without changing chemistry nor increasing temperature. The platforms offers the ability to conveniently generate uniform microparticles, of controllable size with an ease of scale up.

2 Claims, 6 Drawing Sheets

(56) References Cited

OTHER PUBLICATIONS

Jiang et al., Continuous-Flow Tubular Crystallization in Slugs Spontaneously Induced by Hydrodynamics, Crystal Growth & Design 2014 14 (2), 851-860. (Year: 2014).*
Neugebauer et al., Continuous Crystallization of Proteins in a Tubular Plug-Flow Crystallizer, Crystal Growth & Design 2015 15 (3), 1089-1095. (Year: 2015).*
Termuhlen et al (Year: 2021).*
Jiang et al (Year: 2014).*
Neugebauer (Year: 2015).*

* cited by examiner

SLUG-FLOW MANUFACTURING OF UNIFORM AND CONTROLLABLE MICROPARTICLES FOR BATTERY CATHODES

FIELD OF THE INVENTION

The invention generally relates to the production of materials for battery cathodes and, more particularly, to the production of uniform and controllable microparticles for battery cathodes.

BACKGROUND

For lithium ion batteries, a key limiting component for improving safety, performance, and cost is the cathode material, such as nickel-cobalt-manganese oxide (NCM, aka, NMC) with layered crystalline structures. Current methods of manufacturing (e.g., batch reactors) are not able to reliably and conveniently control the microparticle composition and size distribution, which can lead to diminished the battery life and non-optimum use of the expensive and/or toxic materials. Hence, there is an urgent need to improve manufacturing, so as to not only conveniently control the microparticle composition and size uniformity, but also allow reliable and rapid scale up (e.g., to fully utilize the rapid advancements in the battery material architecture).

The expanding demands of lithium ion batteries, in portable electronic devices (e.g., smartphones, tablet PCs) and environmental-friendly vehicles (e.g., electric and/or hybrid vehicles), require to further improve safety, extend battery life, increase charge capacity, and reduce cost. One of the most advanced material options is layered nickel rich LiNi$_x$Co$_y$Mn$_z$O$_2$ (NCMxyz) cathode. Its typical maximum discharge capacity is 250 mA h g$^{-1}$, with energy density 300 W h kg$^{-1}$.

Besides using safe and inexpensive Manganese, an important reason for the popularity and good battery performance of NCM is the synergistic effect of nickel, cobalt, and manganese. Many studies have evaluated different chemical combinations of NCM particles with a single composition (uniform composition profile). For example, NCM111 (Ni:Co:Mn=1:1:1 or Ni$_{1/3}$Co$_{1/3}$Mn$_{1/3}$O$_2$) is widely used in the battery market, with the specific energy capacity of ~220 Wh/kg. NCM622, NCM71.51.5, and NCM811 are known to deliver a high capacity. Among NCM materials (111, 422, 523, 525, 622, 71515), NCM622 (with wide application in industry) has the highest Li$^+$ diffusivity and minimum temperature variation, for the typical operation range of $-25°$ C. to $50°$ C. Generally speaking, an increase in the Ni, Co, and Mn contents can increases the capacity, stability, and safety, respectively; and too much Ni, Co, and Mn can also reduce the cycling stability, capacity, and layered structure, respectively.

The battery performance can be affected by the precursor particle structures, such as the phase ratio of the (Ni$_{0.6}$Co$_{0.2}$Mn$_{0.2}$)OH$_2$ precursors, and possibly void channels in some particles made from metal sulfates, that can accommodate volumetric changes during cycling, especially at high current rates. The structure effect is studied mainly with battery performance degrade, including interconnected factors of surface decomposition, bulk transformation to spinel structure, and mechanical degradation. Surface decomposition can occur when the active material reacts with the solvent, salts, binder, and conductive additives, resulting in the dissolution of Mn$^{++}$ which consumes Li and impedes Li$^+$ transport. Layered oxide structures, which are needed in NMC cathode material for charge storage, have inherent thermodynamic tendency to transform to spinel structure upon deintercalation and rearrangements of cations, and to transform to rocksalt structure by oxygen evolution. The kinetic slowness of these transformations allows for the battery cyclability.

In addition to a few modeling studies, there are experimental studies showing the particle size (e.g., sub-micron sizes) and morphology can affect the battery performance for a few single compositions (NCA and NCM). However, as common experimental variables such as reactant concentrations affect both the composition and particle size, the exact correlation to battery performance for the full space of geometry/composition combination is unknown and very difficult. The effect of size is even more complex to conclude when particles have spatially dependent compositions and are non-uniform due to the manufacturing limitations.

Current synthesis methods for NCM materials include co-precipitation, spray drying/pyrolysis, solid state method, sol-gel synthesis, and combustion method. Solid-state based methods are straightforward. However, the co-precipitation method provides much more uniformity in mixing, with better product control and simpler equipment needs. Co-precipitation is thus popular in industry and applied to complex particles with a specific composition profile (e.g., core-shell, or concentration gradient). These particles have been attempted by building upon simple particles with uniform compositions and then adding layers stepwise. A common route for the synthesis of simple NCM microparticles (uniform distributions) is based on reacting metal salts (e.g., sulfates) with sodium hydroxide, sodium carbonate, or ammonium oxalate, as below $$MSO_4 + Na_2CO_3 \rightarrow MCO_3\downarrow + Na_2SO_4 \qquad (1)$$

$$MSO_4 + 2NaOH \rightarrow M(OH)_2\downarrow + Na_2SO_4 \qquad (2)$$

$$MSO_4 + (NH_4)_2C_2O_4 \rightarrow M(C_2O_4)\downarrow + (NH_4)_2SO_4 \qquad (3)$$

where, M=Ni, Mn, and/or Co. Among these reactions, the sodium hydroxide or carbonate reaction (~10 hours at 45-95° C.) has been more widely studied, with even lower material cost; and the oxalate reaction has higher matrix stability for cations. After the precipitated precursors particles are separated and dried, lithium salt is loaded for heat treatment (calcination) to develop a final crystalline structure, such as Li$_a$Ni$_x$Co$_y$Mn$_z$O$_2$.

Co-precipitation manufacturing techniques, though in common use, have appreciable drawbacks. The conventional co-precipitation manufacturing techniques are mainly based on stirred tanks in batch mode (and recently in continuous mode), with ligand, temperature, pH, and stirring utilized to control the product. The pH can influence the phase ratio of the (Ni$_{0.6}$Co$_{0.2}$Mn$_{0.2}$)OH$_2$ precursors. The mixing rotations per minute (rpm) affects microparticle size distribution. Specifically, low rpm does not provide sufficient mixing, so each microparticle may experience different reaction conditions. High rpm can break microparticles and widen the size distribution resulting in lower quality. The type of metal salts can affect microstructure, such as the unique structure of void channels with metal sulfate-based materials. The definite effect of those parameters requires a uniform reaction environment and independent tuning of microparticle composition and size, which are currently impossible.

Batch-mode stirred tank reactors also suffer from intrinsic batch-to-batch variability, difficulty in scaling up, particle breakage due to high shear, and high energy/time requirements. The issues become much worst for particles with complex structures. Recently continuous-mode stirred tanks were shown to improve particle uniformity, although the problem is not completely solved. The challenges arise from simultaneous competing physicochemical phenomena during phase transition and reactions such as primary and secondary nucleation, growth, attrition, and aggregation. Difficulties are compounded by a large population size and usually undesired kinetics. Similar challenges and fundamental processes exist for pharmaceutical particles produced by stirred tanks.

SUMMARY

Some exemplary embodiments use slug flow to control particle uniformity and size of NCM materials. Exemplary embodiments provide a robust, conveniently scalable continuous flow method that can generate uniform NCM microparticles or other microparticles with tunable qualities.

Microscopically, in a slug-flow reactor, each microparticle experiences the same environment with spatially uniform reaction conditions (kinetics, hydrodynamics) throughout the nucleation-growth process, leading to uniform microparticles with controlled composition and properties. Macroscopically, the manufacturing setup and conditions can remain the same while allowing convenient tuning of the production rate (scaling up or down). In addition, the sequential and spatial addition of the precursor reactant can give rise to new possibilities for manufacturing designer cathode materials optimized for capacity, stability, and safety. Microparticles with a high uniformity and control of the spatial composition will allow for fundamentally understanding of the link to the cathode performance, which will shed light on rational way to produce next generation battery materials.

A feature of some exemplary embodiments is a novel slug-flow reactor for manufacturing of microparticles with controllable size, composition, and radial composition profile. Microparticle uniformity and production scale are tunable without changing equipment or chemistry. Rather microparticle uniformity and production scale are tuned by slug flow characteristics (e.g., flow rate, slug quality, slug number). The microparticle composition profile (e.g., nickel, cobalt, manganese) are varied by controlling the sequential feeds of reactants in slugs (e.g., reactant ratios and sequence). The battery performance (e.g., cycle life, capacity, safety) is affected by the microparticle size, composition profile, and uniformity.

DETAILED DESCRIPTION

Figure 1:
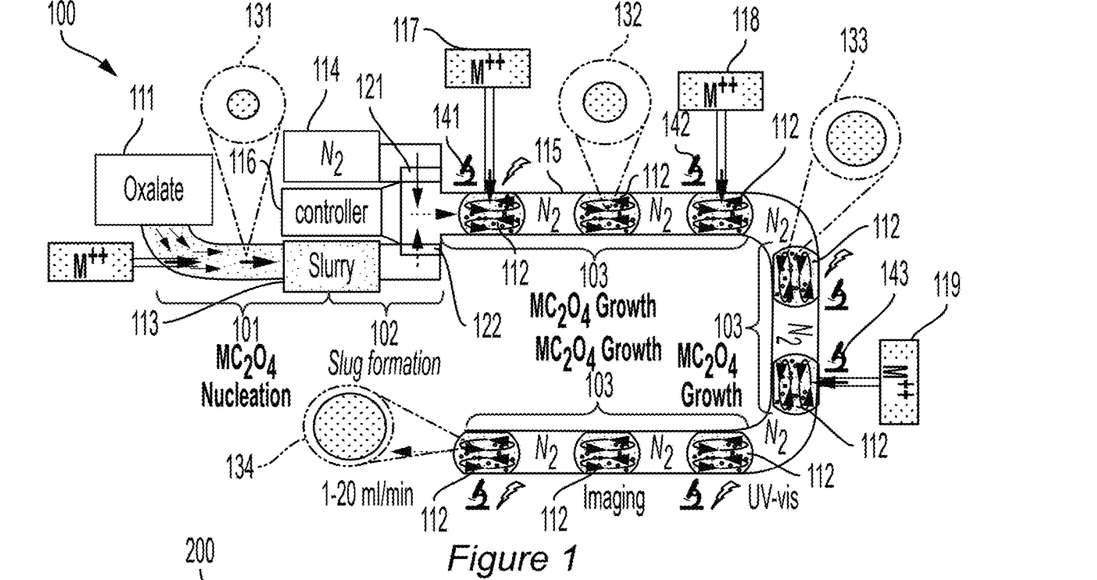
FIG. 1 is an exemplary modular slug-flow reactor system for scalable synthesis of simple or complex microparticles and cathode microparticles (e.g. NCM or Co-free layered cathodes) for batteries using oxalate, hydroxide, carbonate, or nitrate aqueous precursor.

FIG. 1 is a diagram of a slug flow reactor system 100 according to an exemplary embodiment. Such a reactor system may sometimes also be called a crystallizer. A slug-flow reactor system 100 decouples three key production stages with a modular design. The three main stages are nucleation 101, slug formation 102, and growth 103. The decoupling of these three phases provides greater individual control of each stage. For instance, nucleation only occurs at the nucleation stage, not during growth stage. Thus, the total number of microparticles remain the same after the nucleation stage is complete and before the growth stage begins. For exemplary illustrative purposes, system 100 and similar systems show the stages proceeding in the order of nucleation, then slug formation, then growth. Alternatively, embodiments may arrange the stages in the order of slug formation, then nucleation, then growth. Thus nucleation can be performed in slugs if desired. Decoupling nucleation and growth (e.g., nucleation does not occur during growth stage) is a general good strategy for controlling microparticle size, although not necessarily for all cases. The definition distinguishing between nucleation and growth may be according to a size threshold, e.g., 1 micrometer (e.g., particles smaller than 1 micron may be considered as in nucleation stage; particles equal to or larger than 1 micron may be considered as in the growth stage). Depending on the embodiment the size threshold distinguishing these stages may be a size other than 1 micrometer. Moreover, though exemplary systems disclosed herein are especially suitable for the production of microparticles used in battery production, other types of microparticles may also be produced in accordance with this disclosure.

Nucleation 101 comprises forming nuclei (particle cores) from an oxalate (or hydroxide, carbonate, nitrate, or other) aqueous solution 111 that contains one or more metal precursors M++. In FIG. 1 the metal precursors M++ may be a combination of Ni, Mn, and Co at a fixed ratio, for example, to produce NCM microparticles (e.g., NCM111). However other metals (metal ions) may be used depending on the desired composition of the completed microparticle. The oxalate 111 and metal precursors M++ are mixed to form a slurry at nucleation apparatus 113. Due to the fast reaction kinetics upon mixing reactant streams, a nucleation apparatus such as micromixers may be used for controlled nucleation prior to formation of the slugs. Other nucleation apparatuses known in the art or developed at any point in the future may be used for the nucleation stage. Nuclei particle size and number may be tuned using operational parameters.

After nucleation, the slurry is formed into slugs 112 with a fluid phase 114 separating adjacent slugs within a tube 115. An exemplary fluid phase is a gas, such as air or nitrogen, but non-miscible liquids may also be used in some cases. In some embodiments the multi-phase flow may comprise at least three phases which are immiscible with the slugs, meaning the slugs may be separated by more than one distinct fluid phase. For ease of discussion most exemplary embodiments herein will refer to a gas phase 114 as separating all of the slugs. The equipment needs are simple, for instance standard peristaltic pumps 121 and 122 (or other types of pumps) and tubing (reactor) which may even be disposable. The one or more pumps 121 and 122 are arranged at or near the start of tube 115. Tube 115 may also sometimes be called tubing, channel, or pipe. The pump arrangement may vary among embodiments. For instance, in some embodiments it is sufficient for a pump to be provided with the fluid phase source 114 and/or with the aqueous solution source 111. An individual pump may have one or a plurality of pump heads. The one or more pumps 121 and 122 may be controlled by a controller 116 (e.g., a digital programmable controller such as one or more computers capable of automation, and/or a manual controller) capable of varying the volume of each cycle and/or rate of pumping to in turn control process variables like number of slugs per unit length along the tube, slug size, and transport speed. Inbuilt gravity and surface tension forces facilitate the formation of the slugs.

The gas phase 114 may be air or may be a specific gas or combination of gases. In FIG. 1 the gas phase 114 is $N_2$ for exemplary purposes. Slug flow is generally characterized as large bullet-shaped bubbles separated by liquid plugs. The bubbles are large in that they span the cross-sectional area of the tube 115. The length of each bubble may vary, as will be discussed below in connection with scaling up or scaling down the microparticle production rate. Irrespective of bubble size the result of slug formation is multi-phase (e.g., two-phase, liquid-vapor) mixtures passing through a tube 115.

The output of the slug formation stage 102 is a series of substantially identical liquid slugs or segments separated by gas phase. Each slug acts as an independent functional reactor. Useful operational properties of batch crystallizers (e.g., less clogging) and continuous crystallizers (e.g., control of crystal quality and ease of scale up) are achieved without the respective drawbacks of both prior art techniques. The liquid slugs and gas bubbles collectively form a continuous flow in the tube 115.

The growth phase 103 generally occurs over an entirety of the length of the tube 115. The length of the tube 115 is pointedly one variable, among others, that may be used to control the growth. A longer tube 115 may be used for longer residence time, or a shorter tube 115 may be used for a shorter residence time. The growth phase 103 comprises both transportation of the slugs along the tube 115 as well as the sequential addition of feed metal precursors from sources/reservoirs 117, 118, and 119 into the slugs at various different locations along the length of the tube 115. Three inlets for feed metal precursors are shown in FIG. 1 for illustrative purposes, but any number of such inlets may be used depending on the particular embodiment. Generally the inlets or the reservoirs to which they connect are connected to or arranged integrally with pumps for pumping the precursors into the tube. The controller 116 or some other controller(s) may be used to control these pumps. Imaging sensors 141, 142, and 143 may be arranged close to the solution inlets so as to facilitate adding solutions only to the slurry slugs (reactors with particles) and not to the nitrogen phase. The tube 115 may be transparent or semi-transparent to facilitate ease of incorporation of the sensors 141, 142, and 143, which may be optical sensors. Alternatively, other types of sensors may be used which sense the presence or absence of slugs at each inlet and trigger the release of metal precursor.

Depending on the particular microparticles to be grown, temperature is another variable which may be controlled, as necessary. Temperature zones may also be set up along the slug flow reactor in case any reaction needs a temperature other than ambient temperature.

The transportation of slugs along the tube 115 comprises multi-phase flow and particle recirculation within respective slugs. By exploiting multi-phase flow, no further mechanical energy is required or indeed desired in exemplary embodiments. Mixing during the growth phase is achieved entirely by recirculation associated with the multi-phase slug flow. This contrasts with other particle growth techniques that require mixing paddles or other sources of agitation. The typically large-size equipment required for such mixing and agitation at large scales is also not necessary according to present embodiments, even when the production scale is increased many fold.

Figure 2:
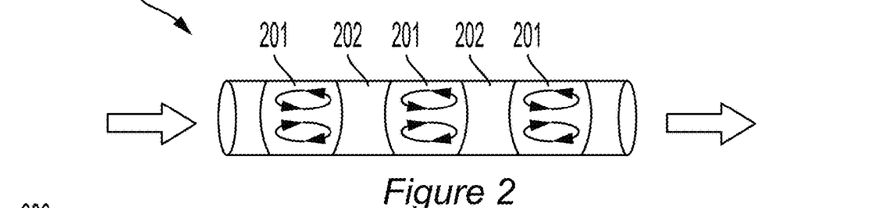
FIG. 2 is a diagram of stable slug flow. Slugs are shown separated by air with recirculation within each slug shown by black arrows.

FIG. 2 illustrates the recirculation that occurs naturally within slugs owing to the multi-phase flow. FIG. 2 shows a section of tube 200 containing three slugs 201 separated by air bubbles 202. Arrows within the slugs 301 show the general recirculation flow that occurs inside each of the slugs as they move along the tube, in this case from page left to page right as indicated by the arrows to either side of the section of tube 200. For tubular-flow reactors and crystallizers, fouling or clogging is an intrinsic operational issue that directly reduces product quality and process efficiency. The slug-flow reactors of exemplary embodiments disclosed herein reduce fouling by exploiting multi-phase hydrodynamics and recirculation inside the slurry slugs to push solids away from tubing wall into the tubing center.

The slug flow is able to carry solids without fouling or clogging, even at high solids contents (e.g., ~17% w/w or possibly greater). Instead of using segmenters (i.e., flow cutters), simple tubing fittings may be used to generate slugs with minimized fouling. Possible other design options include using another non-miscible fluid (replacing air) to separate the liquid slugs. In this way, the reactor life is extended, with waste reduced.

The slug flow growth is superior to conventional manufacturing techniques in a number of ways. Particle size uniformity is notably better. Multiple physical and chemical processes can affect microparticle sizes. The NCM product chemical formula is well established according to other manufacturing techniques, but particle size distribution is very sensitive to the reaction environment in which NCM is produced. In present embodiments, by eliminating any need for stirring blades or other physical devices that move through the slurry of growing particles, particle breakage (e.g., due to impacts with the stirring device) is minimized or eliminated. The uniform (micro)environment, including concentration and temperature, provided by controlled slug flow minimizes or eliminates local high supersaturation spots (which can induce undesired nucleation outside the nucleation stage) and suppresses particle attrition/breakage and aggregation.

As shown in FIG. 1 by particle size visualizations 131, 132, 133, and 134, each microparticle grows progressively larger the longer the retention time within the system 100, in particular, within the tube 115 where the growth phase 103 occurs. Control variables affecting the rate of growth and composition of the growing microparticles are discussed below.

At the end of the tube 115 the completed microparticles are recovered from the tube 115 and may then be used in the production of a battery cathode. No extra step nor equipment is needed for separating air phase from microparticle slurry phase.

Exemplary slug flow reactor systems like system 100 of FIG. 1 allow for independent control of microparticle composition and size in the slug flow. In essence, particle composition and particle size are decoupled variables. In order to increase controllability for complex process and products, each particle property (composition, size) is supported by at least one tunable experimental parameter or variable, and each such parameter may be assigned to only one property so there are no overlapping functions.

The microparticle composition (both the components and ratio of those components) may be controlled using reaction conditions such as but not limited to reaction sequence and reactant ratio. The particle composition has been shown to be most relevant to battery performance in many past studies and is the main factor for crystalline structures. The reaction sequence is used to control components for each substructure (e.g., layers, as discussed below), and reactant ratios and concentrations are used to control the quantitative component ratios.

The particle and substructure size may be adjusted while maintaining composition uniformity using process conditions such as but not limited to flow rate, slug quantity (e.g., per unit length of tubing), and tubing length. The 1-20 ml/min in FIG. 1 is an exemplary approximate flow rate range for one tubular set up, but embodiments may have flow rates which are different (e.g., lower) than this range. And total scale can be higher if putting multiple set up together.

The modular design of exemplary slug flow reactor systems also facilitates the decoupling of control variables. For example, the reaction sequence can be translated into a sequence of time and space separated reactants, through sequential inlet ports along the tubular reactor, as discussed above. The locations and solution contents for each inlet can be adjusted based on the design needs for particle qualities. It should be appreciated that some variables may affect both composition and size such that these parameters are not independently controlled as with respect to the control variable in question.

The system 100 of FIG. 1 is suitable for a variety of microparticle compositions. In the description above it was assumed that it was desirous that the completed microparticles be uniform throughout, e.g., the material composition was the same at the center, at the surface, and at any point therebetween. Other composition structures may be produced by substantially the same system simply by changing the metal precursors in the starting aqueous solution and further metal precursors and the sequence or order in which they are supplied at inlets along the reactor tube.

Figure 3:
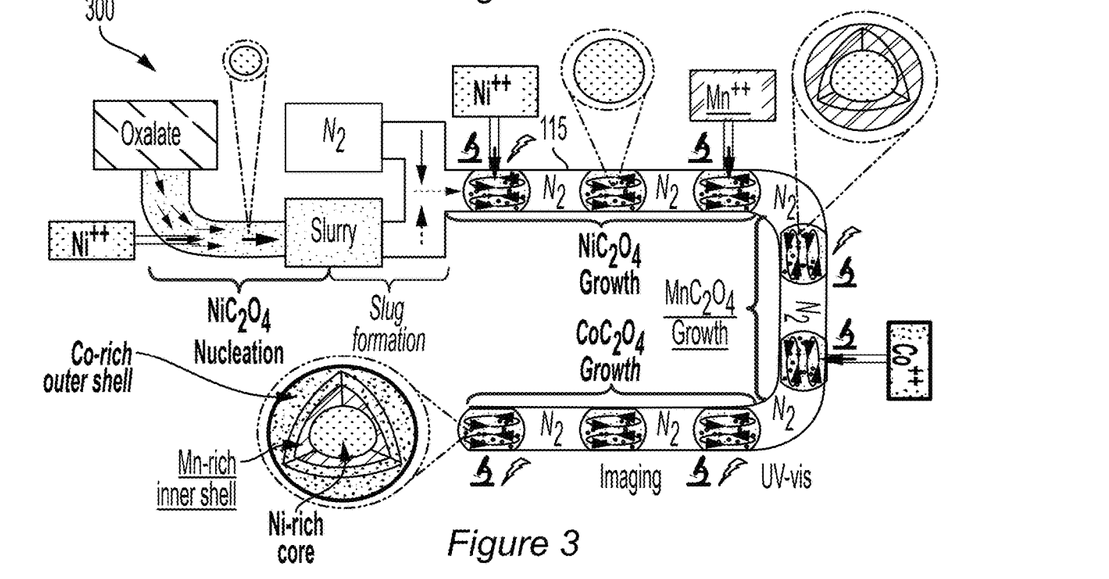
FIG. 3 is an exemplary modular slug-flow reactor to synthesize core-shell microparticles.

FIG. 3 shows a slug flow reactor system 300 that substantially mirrors system 100 of FIG. 1, except for configuration changes facilitating production of core-shell particles. One effective way to improve battery performance and slow degradation is to make NCM microparticles into complex structures, such as core-shell and concentration-gradient structures. For core-shell particles, usually the reactions for the core generation finish first, before the reactions for the shell generation start (on the core surface). Multiple shells may be grown in succession. Simple particles can be considered as complex particles with 100% core and 0% shell. After fixing the reaction sequence, the composition for each substructure (e.g., shell) is then controlled through reactant concentrations and ratios from each of the reactant inlets in FIG. 3.

FIG. 3, for illustrative purposes, shows the growth of microparticles consisting of a core and two shells. The core is Ni-rich, the inner shell is Mn-rich, and the outer shell is Co-rich. The core and respective layers are grown one at a time through sequential addition of feed metal precursors into slugs at various location along the tube. Each layer is grown to completion (e.g., to the desired mass, volume, or thickness) prior to the addition of the next metal precursor and corresponding growth of a new layer. All particles in the reactor have the same residence time for each substructure, which narrows the composition distribution. The growth time (residence time) for each substructure of a particle is individually controlled by the length of tubing between sequential metal precursor inlets and the flow rate in the tubing. The exact tube length dedicated to each growth phase may be determined and set in dependence on the final particle structure desired. The shorter the residence time and/or the larger the seed load, the smaller the mean size increase of the product crystals.

With stable uniform slugs formed and fouling minimized, the exemplary reactors described herein achieve scale-up in many routes, such as by keeping the same piece of equipment (e.g., by simply running the experiment for a longer time to generate more slugs, or by increasing the number of slugs per unit time); and/or by lining up parallel same crystallizers at the same operating conditions (scale out).

Figure 4A:
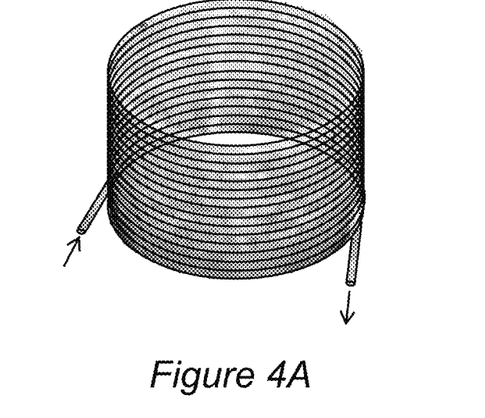
FIG. 4A shows a reactor tube arranged in a coil (i.e., packed).
Figure 4B:
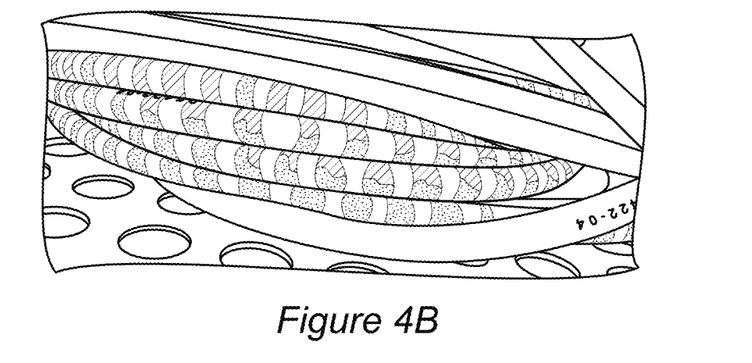
FIG. 4B shows a photograph of a coiled reactor tube.

The tube length for the growth stage may vary among embodiments and increased as necessary to extend the slug retention time and allow more time for growth. For space efficiency, the tube may be coiled as depicted in FIGS. 4A and 4B. For instance, a 15-meter-long reactor tube can be wrapped up around a cylinder, with the longest dimension being less than 0.5 meter. Based on tests, this parallel wrapping with smooth turns inside tubing enhances slug stability in addition to minimizing the physical space required for the reactor.

Figure 5A:
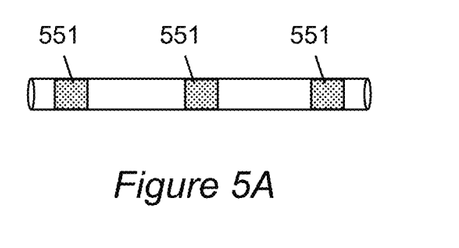
FIGS. 5A and 5B are diagrams of uniform slugs (aspect ratio 1.2) in a packed reactor with different slug-to-slug distances. The average number of slugs per unit length tubing is about twice in FIG. 5B than in FIG. 5A.
Figure 5B:
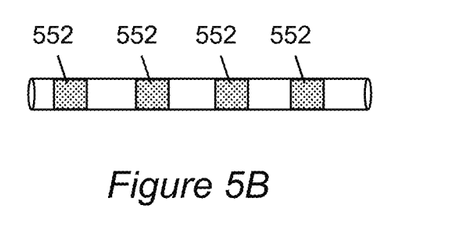

FIGS. 5A and 5B illustrate the effect of changing slug number per unit time or space. Production in an exemplary reactor may be scaled up by increasing the slug number per unit time or space, potentially without equipment change or re-testing. Likewise production may be scaled down without any equipment changes simply by reducing the slug number per unit time or space. FIG. 5A shows slugs 551 spaced further apart as compared to slugs 552 in FIG. 5B. The slugs 551 and 552 are the same size as one another. Assuming no change in flow rate, the production rate of microparticles is greater in FIG. 5B than in FIG. 5A.

Figure 6A:
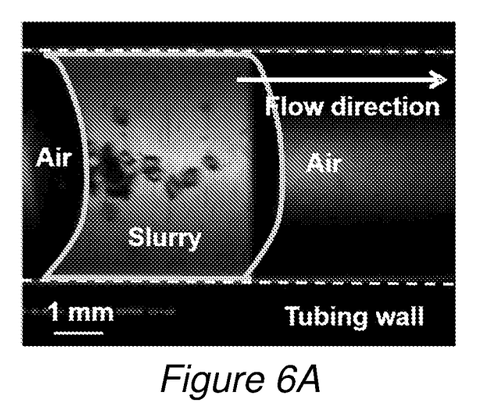
FIG. 6A is in-line imaging of a slug with an aspect ratio~1.
Figure 6B:
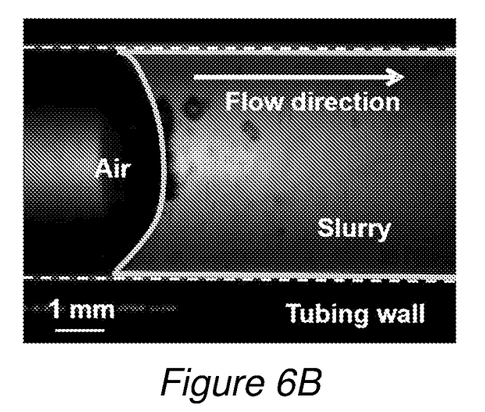
FIGS. 6B and 6C are in-line imaging of a slug, back & front, with an aspect ratio~4 at the same chemical condition as the slug from FIG. 6A.
Figure 6C:
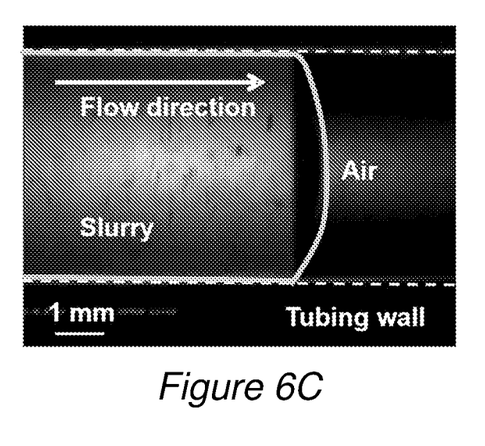

Stable uniform slugs of controlled aspect ratios can be generated by varying the pump rates of liquid and gas, without equipment change. The slug aspect ratio (the ratio between slug length along tubing and the tubing inner diameter) matters as well, for both solids transfer and growth control. An exemplary aspect ratio is 1 or approximately 1. In some embodiments an acceptable aspect ratio is 0.8-1.2. In a "long" slug, there are both tiny crystals at the front of the slug (FIG. 6C), and crystals much larger at the back (FIG. 6B), as the density of crystals is higher than solvent water. In a slug with an aspect ratio of ~1 (FIG. 6A) at the same chemical condition, crystals are more evenly spread out in the slug reactor with more uniform size, likely due to improved mixing from the slug geometry. Approximately 1 means 1 plus or minus a margin of error standard accepted within the industry.

It is desirable that the microparticles produced by exemplary systems disclosed herein be generally consistent with respect to bulk composition and compositions of each substructure, as well as exhibit crystal lattice matching between adjacent layers. Quality control measures may be performed as necessary or desired. For instance, to assess bulk composition, the spatial distribution of composition can be confirmed with EDX and/or inductively coupled plasma mass spectrometry (ICP-MS). Compositions at different cross sections can be analyzed by SEM and EDX, after embedding microparticles in an epoxy and polishing with sandpaper to a desired cut. Crystal lattice matching between adjacent layers may be confirmed with TEM analysis of nanotopography created by focused ion milling. Although ideal uniformity is almost impossible for complex products, any improvement in controllability is a significant advancement in the art. The particle growth progress and kinetics of any slug flow reactor system may be analyzed for quality control purposes using a variety of in-line analytical tools, such as bright field imaging.

Figure 7:
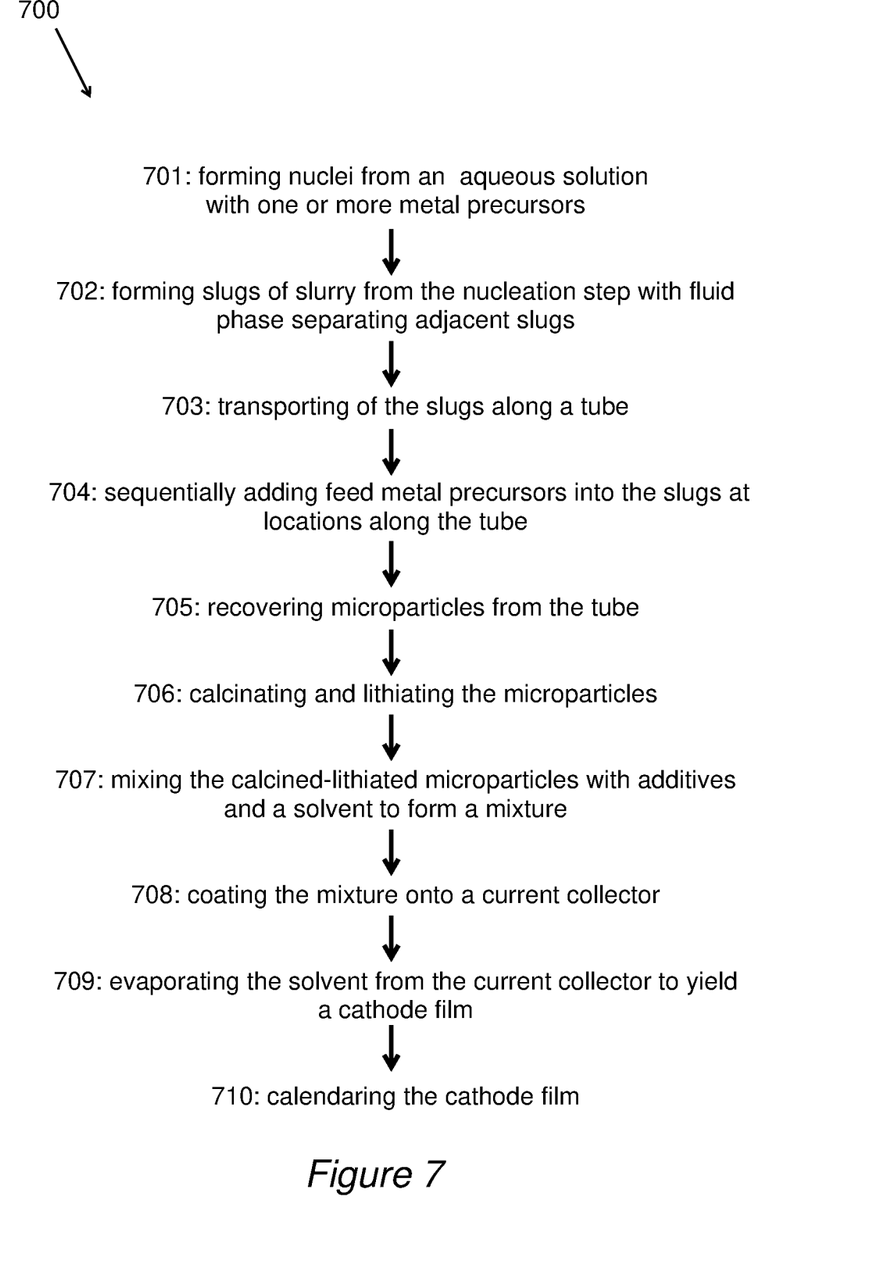
FIG. 7 is an exemplary method of manufacturing a battery including the manufacture of cathode microparticles.

FIG. 7 shows a method 700 of making a battery cathode. The first several steps are simply those for making microparticles suited for use in battery cathodes, as discussed above and illustrated by FIGS. 1 and 3 for example. Step 701 is forming nuclei from an aqueous solution containing one or more metal precursors. Step 702 is forming slugs of slurry from the nucleation step with fluid phase separating adjacent slugs. Step 703 is transporting of the slugs along a tube. Step 704 is sequentially adding feed metal precursors into the slugs at locations along the tube. Step 705 is recovering microparticles from the tube, e.g., nickel-cobalt-manganese oxalate. Step 706 is calcinating and lithiating the microparticles. The particles from slug-flow reactor are heated (i.e., calcined) to remove the non-metal component (oxalate, nitrate, etc) and then lithium carbonate or lithium hydroxide is added and further heated in air to embed lithium in the material along with oxygen. The resulting material is, for example, Lithium-Nickel-Cobalt-Manganese oxide, which is finally used to make the battery cathode. It is termed as NCM material. Step 707 is mixing the calcined-lithiated microparticles with additives and a solvent to form a mixture. Step 708 is coating the mixture onto a current collector. Step 709 is evaporating the solvent from the current collector to yield a cathode film. Step 710 is calendaring the cathode film. The cathode is then ready to be combined with other components of a complete battery such as anode, separator, and electrolyte (e.g., for a 2032 coin-type cell, a porous polypropylene separator, a lithium metal anode, and 1.2 M LiPF6 electrolyte with 3:7 ethylene carbonate:ethylmethyl carbonate dissolved). The result is a battery with desirable safety, capacity, and charge rate parameters. The additives mentioned may be a polymer binder and carbon black particles, and the solvent may be an organic solvent.

As specific non-limiting illustration, for use in the battery cathode, NCM microparticles are mixed with polymer binder (e.g., polyvinylidene fluoride) and carbon black particles in an organic solvent (e.g., n-methyl-2-pyrrolidone), then coated onto the current collector (e.g., aluminum foil). The solvent is then evaporated and cathode film calendared before use.

EXAMPLES

Figure 8:
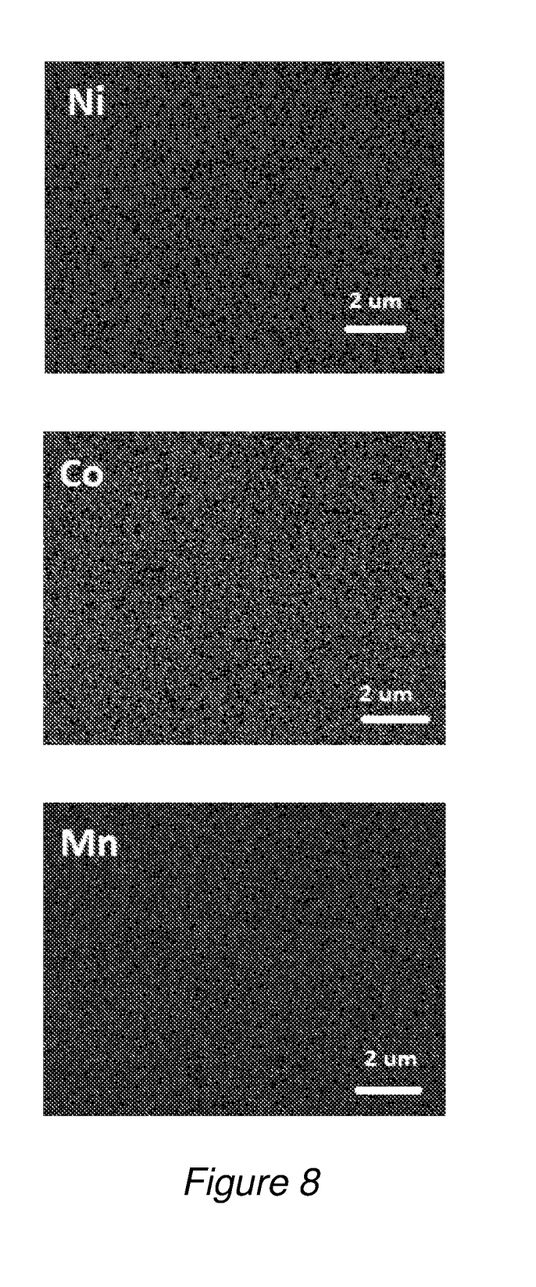
FIG. 8 is EDX analysis for elemental distribution in the NCM material. The yellow, red, and blue dots represent the distributions of Ni, Co, and Mn, respectively.
Figure 9A:
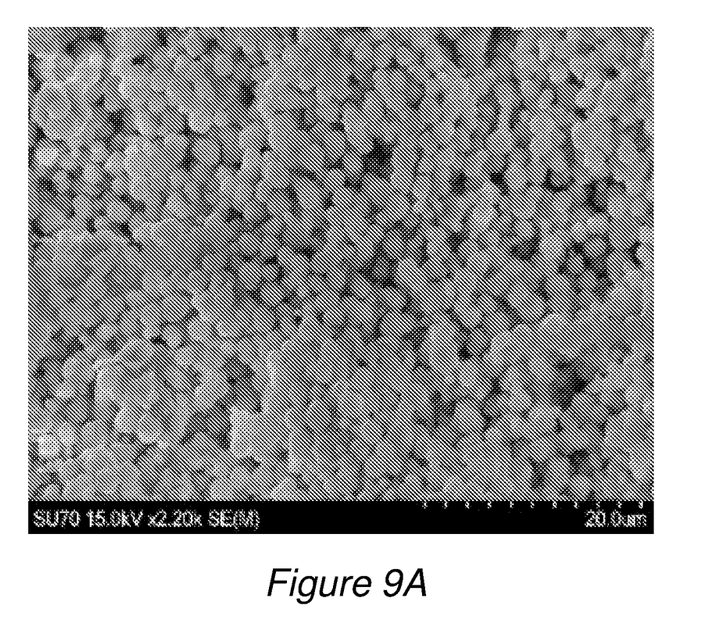
FIG. 9A is an SEM image of NCM ($Ni_{1/3}Co_{1/3}Mn_{1/3}CO_3$) microparticles.
Figure 9B:
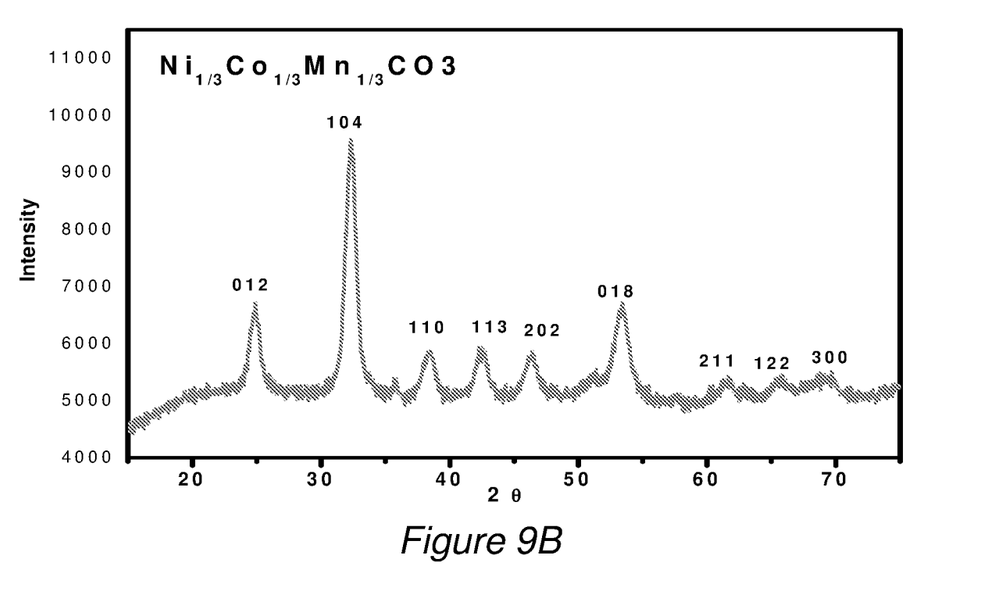
FIG. 9B is an X-ray diffraction analysis of NCM ($Ni_{1/3}Co_{1/3}Mn_{1/3}CO_3$) microparticles.

Example 1. Batch Co-Precipitation Production of NCM Microparticles and Characterization This example describes production of NCM by batch co-precipitation reaction of metal sulfates with sodium carbonate and ammonium carbonate. Based on the desired ratio of metals, known amounts of cobalt sulfate, nickel sulfate, and manganese sulfate are dissolved in water (for example, 0.1 mole/liter each), then sodium carbonate is added (e.g., 0.4 moles/liter) to produce metal carbonate particles. Next ammonium carbonate (e.g., 0.3 moles/liter) is added to the Teflon-lined reactor then the mixture is kept at 180° C. for 24 hours hydrothermal reaction. The reactor is cooled, before the solid precipitate is separated, washed, and dried to obtain $Ni_{1/3}Co_{1/3}Mn_{1/3}CO_3$ microparticles. The desired amount of lithium hydroxide is mixed with the carbonate, before heat treatment to produce $Ni_{1/3}Co_{1/3}Mn_{1/3}CO_2$ particles. Based on the energy-dispersive X-ray (EDX) analysis of these oxide particles in FIG. 8, the elemental ratio is Ni:Co:Mn=0.34:0.33:0.33, consistent with the original feed composition. The uniform distribution of color brightness (element signal intensity) suggests uniform distribution of element composition in the simple NCM particles at the bulk level. However, these particles of a few micron size made in lab-scale batch reactors already contain some aggregations and size variations (FIGS. 9A and 9B). Uniform-size NCM particles in larger-scale batches would be almost impossible to make by batch co-precipitation, especially for complex structures.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be separated from or combined with the features of any of the other several embodiments without departing from the scope or spirit of the present invention. Any recited method can be carried out in the order of events recited or in any other order which is logically possible.

While exemplary embodiments of the present invention have been disclosed herein, one skilled in the art will recognize that various changes and modifications may be made without departing from the scope of the invention as defined by the following claims.

What is claimed is:

1. A method of making a battery cathode, comprising:
    forming nuclei from one or more metal precursors in an aqueous solution;
    forming slugs of the aqueous solution with fluid phase separating adjacent slugs;
    transporting of the slugs along a tube during a growth phase;
    sequentially adding further feed metal precursors into the slugs at locations along the tube;
    recovering microparticles from the tube;
    calcinating and lithiating the microparticles;
    mixing the calcined-lithiated microparticles with additives and a solvent to form a mixture;

coating the mixture onto a current collector;
evaporating the solvent from the current collector to yield a cathode film; and
calendaring the cathode film.

2. The method of claim 1, wherein the additives are a polymer binder and carbon black particles, and wherein the solvent is an organic solvent.

* * * * *